United States Patent [19]
Gray

[11] 3,926,663
[45] Dec. 16, 1975

[54] METHOD AND APPARATUS FOR SCRUBBING THE ENDS AND SIDES OF A MOTOR VEHICLE

[76] Inventor: James H. Gray, 3411 E. Gold Dust Ave., Phoenix, Ariz. 85028

[22] Filed: Oct. 11, 1973

[21] Appl. No.: 405,329

[52] U.S. Cl. .............. 134/6; 15/21 D; 15/DIG. 2; 134/32
[51] Int. Cl.² ............................................ B08B 1/02
[58] Field of Search .......... 134/6, 32, 123; 15/21 D, 15/DIG. 2

[56] References Cited
UNITED STATES PATENTS

| | | | |
|---|---|---|---|
| 3,090,981 | 5/1963 | Vani et al. | 15/21 D |
| 3,237,229 | 3/1966 | Weigele et al. | 15/21 D |
| 3,466,688 | 9/1969 | Fuhring et al. | 15/21 D |
| 3,486,182 | 12/1969 | Solomon | 15/21 D |
| 3,688,328 | 9/1972 | Wilkins | 15/21 D |

Primary Examiner—S. Leon Bashore
Assistant Examiner—Richard V. Fisher
Attorney, Agent, or Firm—Cahill, Sutton & Thomas

[57] ABSTRACT

The system disclosed is a brushing installation for use in scrubbing the front, rear and sides of a motor vehicle. A pair of front/side brushes and a pair of side/rear brushes provide double coverage of these surfaces during a single passage of the vehicle. The brushes are suspended from short, side-mounted pivot arms and displacement of the brushes during operation is a function of vehicle position relative to the brushing installation.

8 Claims, 19 Drawing Figures

METHOD AND APPARATUS FOR SCRUBBING THE ENDS AND SIDES OF A MOTOR VEHICLE

BACKGROUND AND OBJECTS OF THE INVENTION

This invention relates to automatic vehicle washing installations and, more particularly, to that portion of the installation used to scrub the generally vertical side and end surfaces of the vehicle.

One of the major technical difficulties encountered by the car wash industry has been to achieve a structure which will adequately scrub the side and end surfaces of variously shaped and dimensioned vehicles. In the present state of the art, one vertically disposed brush is used to scrub one side and a portion of each end of the vehicle. A second brush is typically employed to wash the other side and the remaining portions of the vehicle end surfaces. These prior art structures are referred to as "wrap-around" brushes in that they are controlled to pass across the front, down the side and across the rear of the vehicle.

The positioning and movement of wrap-around brushes has in the past required complex sensing and control mechanisms. Frequently the brushes themselves "bounce" or fail to follow irregularities in the vehicle contour, particularly at the transition between end and side surfaces. Because of the difficulties typically encountered in removing road dirt and film from the vehicle surfaces, extensive efforts have been made to increase what is referred to as the "dwell time" of the brushes, that is the amount of time the brushes are in contact with the vehicle surfaces.

One approach to increasing dwell time has been to increase the length of the pivotal arms which support the brushes as they are moved around the vehicle. These efforts have resulted in even more complicated devices having multiply jointed support arms, telescoping support arms or support arms having movable pivot points. Such installations have proven to be extremely expensive, of limited reliability and subject to extensive mechanical wear. Furthermore, the increase in effective length of the support arms has required a corresponding increase in the overall length and width of the installation which, in turn, has resulted in the need for additional building space and land.

A technique for increasing dwell time which is often practiced by car wash operators is simply to slow down the rate at which the vehicle is drawn through the washing installation or the rate at which the installation is moved past the stationary vehicle. Not only does this technique substantially reduce the number of vehicles that can be washed during a given period of time but it also requires the use of additional amounts of water, electricity and chemicals for the adequate cleaning of a single vehicle. These factors directly affect the efficiency and thus the profitability of the car wash installation.

Still another approach to increasing the brush dwell time has been simply to repeat the scrubbing cycle through which the brush passes. This approach also reduces the rate at which vehicles can be washed while increasing the total energy, water and chemical consumption of the installation. Furthermore, unnecessary repeated scrubbing cycles directly reduce the mechanical life of the equipment and significantly contribute to the necessity for maintenance and repair. Examples of the foregoing prior art techniques are shown and described in U.S. Pat. Nos. 3,310,824 (Beer); 3,350,733 (Hanna); 3,428,983 (Seakan); 3,000,025 (Emanuel); 3,522,619 (Weigele); and 3,332,098 (Smith).

It is the principal object of the present invention to provide a method and an apparatus for substantially increasing the effective brush dwell time of a car washing installation without decreasing the rate at which vehicles may be washed, without increasing space requirements of the installation and without increasing the amount of resources consumed in adequately cleaning the surfaces of a typical vehicle.

A more specific object of this invention is to provide a method and a simple, low maintenance apparatus for double washing the end and side surfaces of a vehicle in a single scrubbing cycle.

Another object of this invention is to provide a brush system which is extremely uncomplicated in design and thus improved reliability and subject to substantially less mechanical wear.

A further object of this invention is to provide an apparatus for scrubbing the end and side surfaces of a vehicle, which device requires minimal control circuitry and related apparatus.

Still another object is to achieve the foregoing objects in a less expensive and more reliable car wash installation which occupies less space and requires less maintenance and observation.

Many recently designed car wash systems require a particular direction of brush rotation to assist the brush in advancing across the front or rear of the vehicle being washed. Frequently, such rotation of the brushes results in a tendency to lift and bend protrusions such as license plates away from the vehicle surface. Furthermore, because one brush is generally used to scrub at least half of the front and rear surfaces, the rotation of the brush is such that cleaning in recessed areas such as wheel wells invariably lacks uniformity and in many instances is totally inadequate. Heretofore, efforts have been made to resolve this problem by reversing the direction of brush rotation at various times as the brush proceeds about the car. An alternative solution has been simply to repeatedly pass the brush over the surfaces of the vehicle. Periodic brush reversal requires extensive and complex sensing and control equipment and contributes to the mechanical deterioration of the brushing mechanism, particularly gear boxes and the like.

Accordingly, it is another object of this invention to provide an improved method and apparatus for scrubbing the end and side surfaces of vehicles in a manner which substantially preclude the deformation of protrusions such as license plates and which will uniformly clean recessed areas in the vehicle surfaces.

Wrap-around brush systems, as their name implies, are required to make fast and virtually discontinuous transitions in scrubbing direction as they move from the end surfaces of the vehicle to the side surfaces and vice versa. The difficulty in making these transitions while still adequately scrubbing the vehicle is multiplied when the vehicle design includes irregular protrusions or recessions at or in the vicinity of the vehicle's front and rear corners. Frequently, the brushes lose contact with the vehicle surface as this transition is made; occasionally, the opposite occurs and the brushes "hang up" or become caught in a surface irregularity as the vehicle advances through the installation relative to the brush. This most frequently occurs at the transition between the front and side surfaces.

Thus, it is another object of this invention to provide an improved method and apparatus for scrubbing the end and side surfaces of vehicles while substantially inhibiting the tendency of the brushes to either leave the surface of the vehicle or to become caught in surface irregularities as the vehicle advances.

SUMMARY OF THE INVENTION

Briefly stated, and in accord with one embodiment of the invention, two pairs of brushes having specified rotational characteristics are supported by short unitary arms pivoted to swing the brushes through the path of the vehicle and initially to bias the brushes toward the advancing vehicle. The first set of brushes scrubs across the front of the vehicle to at least the center thereof, back out to the sides and along the side surfaces to the rear of the vehicle. The other pair of brushes scrubs first along the side surfaces to the rear of the vehicle, then across rear surface to the center thereof and finally back across the rear surface to the sides of the vehicle.

DESCRIPTION OF THE DRAWING

The invention is pointed out with particularity in the appended claims. However, other objects and advantages together with the operation of the invention may be better understood by reference to the following detailed description taken in conjunction with the following illustrations wherein:

DETAILED DESCRIPTION OF THE INVENTION

Figure 17:
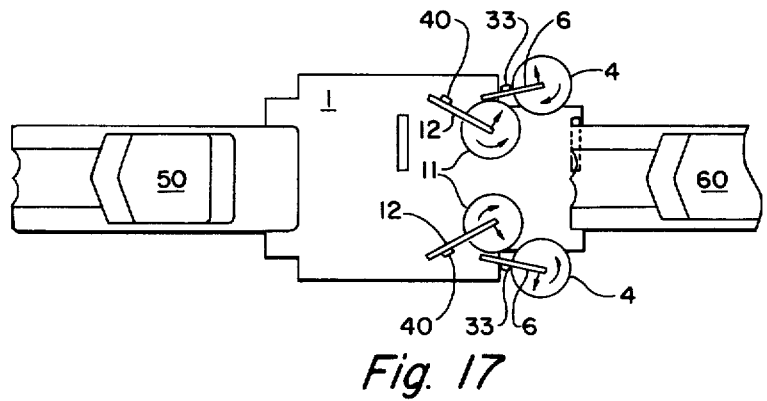
Figure 18:
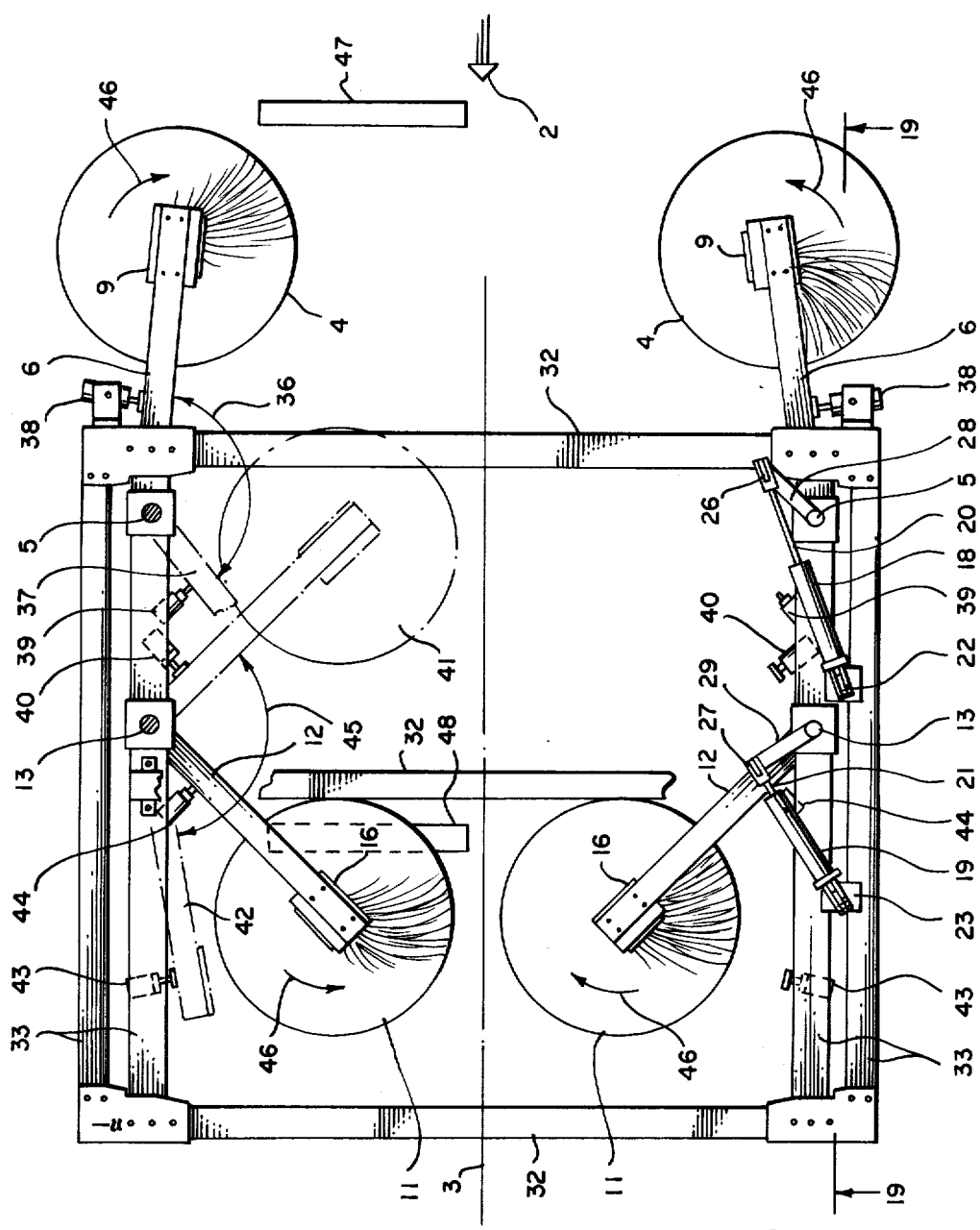
FIG. 18 is an upper elevational view of the brushing mechanism shown generally in FIGS. 1 through 17 and illustrating in more detail the actuation, detection and positioning means which may be incorporated into the illustrated embodiment of the invention.
Figure 19:
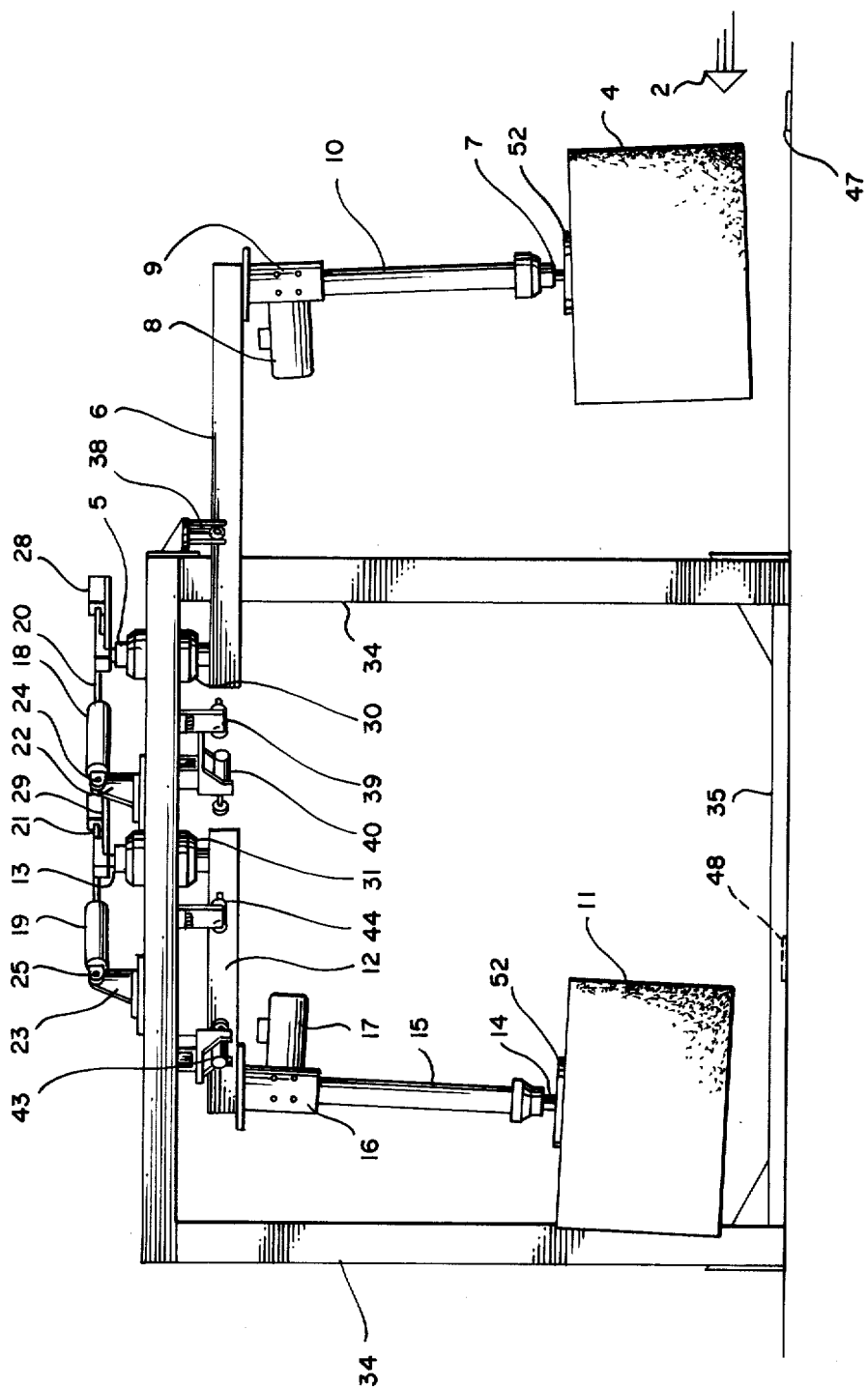
FIG. 19 is a side elevation viewed along position 19—19 in FIG. 18 and further illustrating the mechanical relationship between the brushes, support arms, and various actuation, detection and positioning means incorporated into the illustrated embodiment of the invention.

In order to better illustrate the advantages of the invention and its contributions to the art, the various mechanical features of the preferred embodiment disclosed in FIGS. 18 and 19 will be reviewed in detail. Thereafter, the interrelationship between these mechanical features and the overall operation of the disclosed embodiment of the invention will be described in detail in conjunction with FIGS. 1 through 17.

FIG. 18 is a top view of one form of brush installation 1 embodying the present invention. The arrow 2 indicates the direction of an entering vehicle and the broken line 3 denominates the center line of the brush installation.

The installation of FIG. 18 consists of a first pair of side/rear brushes 4 which are pivoted about pivotal shafts 5 by way of horizontal support arms 6. As can be seen in FIG. 19, the side/rear brushes 4 are suspended from horizontal arms 6 by drive shafts 7. Rotation is imparted to side/rear brushes 4 by means of an appropriate motor 8. Motor 8 may be either hydraulically, pneumatically or electrically driven and may be connected to drive shafts 7 by an appropriate gear box 9. Drive shafts 7 may conveniently be mounted for rotation within axial bushing 10.

The brushing installation 1 of FIGS. 18 and 19 further includes a pair of front/side brushes 11 which are mounted by way of horizontal support arms 12 for pivotal movement about pivotal shaft 13.

The remaining physical features associated with front/side brushes 11 are substantially identical to those associated with side/rear brushes 4. In particular, the front/side brushes 11 are suspended for rotation from horizontal support arms 12 by way of drive shafts 14 which are connected via axial bushing 15 and gear box 16 to motor 17.

Although the various mechanical elements associated with each of the side/rear brush mechanisms 4 are substantially identical, as is also true of the mechanical elements associated with each of the individual front/side brush mechanisms 11, the upper half of FIG. 18 particularly illustrates the location and disposition of certain damping and sensing devices used in conjunction with the movement of side/rear brushes 4 and front/side brushes 11. On the other hand, the lower portion of FIG. 18 particularly illustrates the control mechanisms used in positioning side/rear brushes 4 and front/side brushes 11.

Referring first to the lower portion of FIG. 18, the principal components of which are further illustrated in the side elevational view of FIG. 19, it is seen that a pivoting motion is imparted to horizontal support arms 6 and 12 by means of drive cylinders 18 and 19.

Drive cylinders 18 and 19 are of a well-known configuration wherein air pressure may be applied to one side of the drive piston so as to force the extension of cylinder rods 20 and 21. Or, air pressure may be applied to the opposite side of the piston so as to force the retraction of cylinder rods 20 or 21. The cylinder rod 20 associated with drive cylinder 18 is shown in the maximum extended position while the cylinder rod 21 associated with drive cylinder 19 is shown in the maximum retracted position.

The cylinder mounts 22 and 23 to which drive cylinders 18 and 19 are pin connected (24, 25) are free to rotate about vertically disposed axes. The displaceable ends of cylinder rods 20 and 21 are rotatably mounted (26, 27) to linkage arms 28 and 29 which have their opposite ends secured to pivotal shafts 5 and 13. As is illustrated in FIG. 19, pivotal shafts 5 and 13, after passing through respective bearings 30 and 31, are mechanically secured to horizontal support arms 6 and 12.

Accordingly, by way of example, when pneumatic pressure is applied to one side of drive cylinder 18, cylinder arm 20 is extended and results in the clockwise rotation of side/rear brush 4 about pivotal shaft 5. On the other hand, when pneumatic pressure is applied to the opposite side of drive cylinder 18, cylinder arm 20 is retracted and side/rear brush 4 is rotated in a counterclockwise direction about pivotal shaft 5.

As will be obvious to those skilled in the art, the side/rear brush mechanisms 4 and the front/side brush mechanisms 11 are supported by an appropriate framework including cross members 32, longitudinal members 33, vertical support members 34 and base members 35.

It will also be obvious to those or ordinary skill in the art that the brush installation 1 shown in FIGS. 18 and 19 may preferably be combined with well-known top brush mechanisms or friction shaker curtains adapted to scrub the upper portions of the vehicle.

Referring now to the upper portion of FIG. 18, it will be observed that the horizontal support arm 6 is pivotally mounted for rotation through the angle indicated by circular vector 36. In particular, the horizontal support arm 6, during operation of the brushing installation 1, is variously positioned between its extreme forward position illustrated by the solid line 6 and the extreme rearward position partially illustrated by the dotted lines 37. Pneumatic bumper 38 serves to dampen or buffer the movement of the side/rear brush mechanism 4 when it is moved to or held in its extreme forward position. Pneumatic detector 39 senses the horizontal support arm 6 when it reaches its extreme rearward position illustrated by dotted lines 37. Actuation of pneumatic detector 39 by horizontal support arm 6 results in the switching of pneumatic pressure from one end of the drive cylinder 18 to the opposite end thereof. This air pressure reversal is accompanied by a reversal in the pivotal direction of horizontal support arm 6 and thus brush mechanism 4. As has been pointed out earlier, the drive cylinders 18 and 19 and the associated linkages have been omitted for clarity from the upper portion of FIG. 18. However, the corresponding pneumatic bumper 38 and pneumatic detector 39 have been illustrated on the lower portion of FIG. 18 and have also been illustrated in FIG. 19.

Referring now to the upper portion of FIG. 18 as it relates to front/side brush mechanism 11, it is seen that pneumatic bumper 40 serves to dampen or buffer the movement of the front/side brush mechanism 11 when it is moved or held in its extreme forward position. The extreme forward position of front/side brush 11 is illustrated by the broken outline 41.

The extreme rearward position of the horizontal support arm 12 is partially illustrated by the dotted lines 42. Pneumatic bumper 43 serves to dampen or buffer the movement of the front/side brush mechanism 11 when it is moved to or held in its extreme rearward position. Intermediate pneumatic detector 44 is actuated by horizontal support arm 12 when front/side brush 11 is located in the solid line position shown in FIG. 18. This solid line position corresponds to the disposition of front/side brushes 11 at the front corners of the vehicle as will become clear from the forthcoming discussion of FIGS. 1 through 17 and, in particular, FIG. 6. Actuation of intermediate pneumatic detector 44 results in the reversal of the pivotal direction of horizontal support arm 12. Circular vector 45 indicates the maximum angle through which horizontal support arm 12 passes during operation of the brushing installation. Rotational vectors 46 indicate the direction in which the side/rear brushes 4 and the front/side brushes 11 are rotated by motors 8 and 17.

Floor switch 47, when actuated by the front right tire of an incoming vehicle, serves to actuate drive cylinder 18 so as to pivot side/rear brushes 4 into the sides of the vehicle.

The floor switch 48 is also actuated by the front right tire of the incoming vehicle. Floor switch 48 serves to reverse the force exerted by drive cylinder 19 on horizontal support arm 12 so as to pivot front/side brush mechanism 11 from the extreme rearward position illustrated by dotted lines 42 and against the side of the vehicle.

The functional interrelationship between floor switch 48, pneumatic detector 44 and penumatic bumper 43 will become more apparent in conjunction with the forthcoming detailed description of the operation of brushing mechanism 1 as taken in conjunction with FIGS. 1 through 17.

For the purpose of simplicity of illustration and explanation, the various pneumatic interconnections between the drive cylinders 18 and 19, floor switches 47 and 48 and pneumatic detectors 39 and 44 have been omitted. These means of interconnection are well-known to those or ordinary skill in the art of car washing technology.

As will be seen in conjunction with FIGS. 1 through 17, the various mechanical components illustrated in detail in FIG. 18 occur in mirror image pairs with symmetry being about center line 3 with the exception of floor switches 47 and 48. As will also become apparent in conjunction with FIGS. 1 through 17, the movement of one of the side/rear brushes 4 corresponds in approximately mirror image movement of the other side/rear brush 4. There is a similar mirror image correspondence between the movements of the two front/side brushes 11. The two brushes in each pair move in substantial unison in response to the advancing vehicle; they are otherwise mechanically independent.

Figure 1:
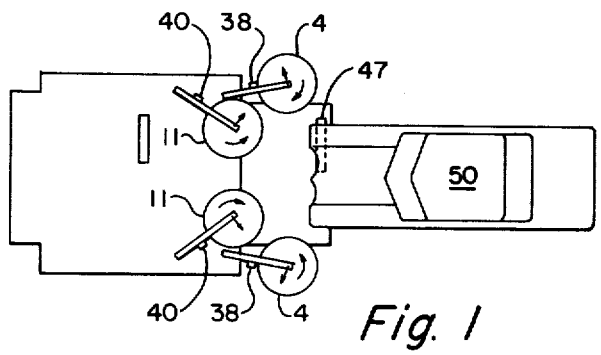
FIGS. 1 through 17 consist of a series of generalized drawings showing a vehicle proceeding through a car washing installation embodying the present invention and illustrating the various steps in the method of the present invention.

With reference to FIGS. 1 through 17, the sequence of operation of the brushing mechanism illustrated in FIGS. 18 and 19 will now be described. Referring to FIG. 1, it will be noted that each of the side/rear brushes 4 and each of the front/side brushes 11 contain small circular vectors indicating the direction of rotation of the brushes and small tangential vectors indicating the direction of the pivotal force exerted by the drive cylinders 18 and 19 (not shown) on the brush mechanisms themselves.

In the initial position of FIG. 1, the side/rear brushes 4 are being held in their most extreme forward position against pneumatic bumpers 38 while front/side brushes 11 are being held in their most extreme forward position against bumpers 40.

The vehicle 50 is shown entering the brush installation 1 from the right. Floor switch 47 is shown slightly ahead of the front right tire of vehicle 50.

Figure 2:
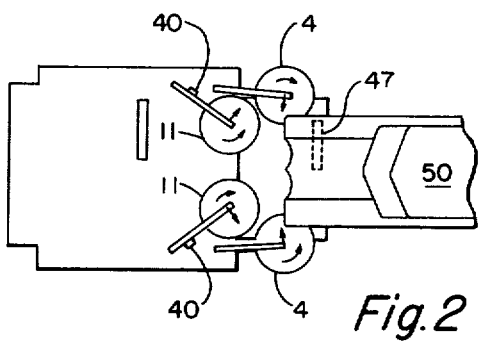

In FIG. 2, the vehicle 50 has advanced so that the front right tire thereof has actuated floor switch 47, thereby resulting in the reversal of the pivotal force exerted on side/rear brushes 4. Side/rear brushes 4 are now force biased against the sides of the vehicle 50 at the front corners thereof. Front/side brushes 11 remain force biased against pneumatic bumpers 40.

Figure 3:
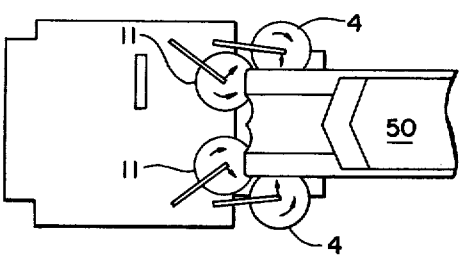

In FIG. 3, the vehicle 50 has proceeded to a point where the outer portions of its front surface have engaged front/side brushes 11. Side/rear brushes 4 continue to be force biased against the sides of the vehicle 50 as they progress therealong.

Figure 4:
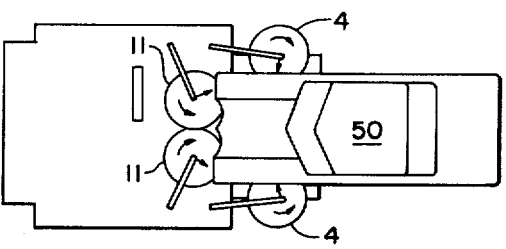

In FIG. 4, the right-to-left progress of vehicle 50 has resulted in the progression of front/side brushes 11 across the front of the vehicle 50 toward the center thereof.

Figure 5:
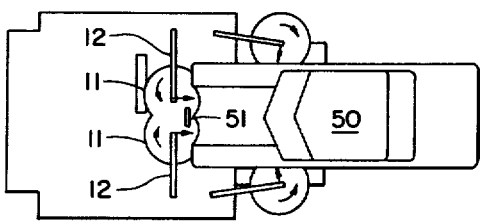

In FIG. 5, the vehicle 50 has progressed to a point where the horizontal support arms 12 of front/side brushes 11 are both approximately perpendicular to the center line of the car wash.

In FIG. 5, a front license plate 51 is illustrated in its typical position, and it is noted that the rotation of front/side brushes 11 is in a direction which tends to flatten license plate 51 against the front surface of the vehicle 50 rather than lift and bend its edges away from the front surface of the vehicle 50 as would be true with opposite brush rotation typical of many prior art car washing installations. It is by this means that the present invention avoids one of the most troublesome problems associated with prior art car washes, namely, the deformation of surface protrusions such as license plates.

At the point illustrated in FIG. 5, the front/side brushes 11 have completed the first wash of the front surface of vehicle 50.

Figure 6:
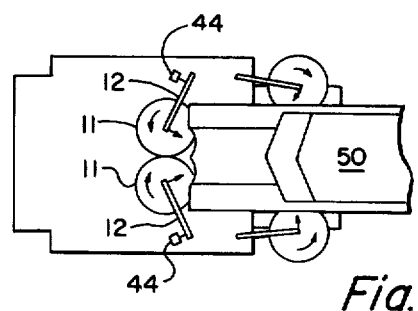

In FIG. 6, the vehicle 50 has proceeded further to the left and the front/side brushes 11 have begun to proceed from the center of the vehicle back toward the front corners thereof. It will be noted that, in comparing the brushes as illustrated in FIG. 1 with the brushes as illustrated in FIG. 6 that, when the brushes are brought into engagement with the surface of the vehicle, the pivotal force exerted by drive cylinders 18 and 19 result in the crushing or deformation of the brushes from their otherwise generally circular configuration. Accordingly, the force exerted by the brush against the vehicle surface is frequently referred to as "crush pressure." The crush pressure of the present invention may be controlled through an appropriate valving arrangement (not shown) which allows variation of the pressure exerted on drive cylinders 18 and 19. This ability to vary the crush pressure allows the operator to increase or decrease the amount of force exerted by the brushes against the car surfaces to compensate for increasingly or decreasingly adverse weather and dirt conditions.

As illustrated in FIG. 6, the horizontal support arms 12 of front/side brushes 11 are approaching contact with pneumatic detectors 44. Pneumatic detectors 44 will be actuated by horizontal support arms 12 soon after the outer periphery of the front/side brushes 11 have passed the sides of the vehicle 50. As has been pointed out earlier, actuation of pneumatic detectors 44 results in the reversal of the force exerted on horizontal support arms 12.

Figure 7:
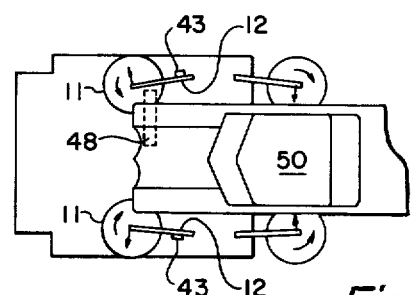

In FIG. 7, the pivotal direction associated with front/side brushes 11 has been reversed and the horizontal support arms 12 have been forced into engagement with pneumatic bumpers 43. As shown in FIG. 7, the right front tire of vehicle 50 is approaching floor switch 48.

Figure 8:
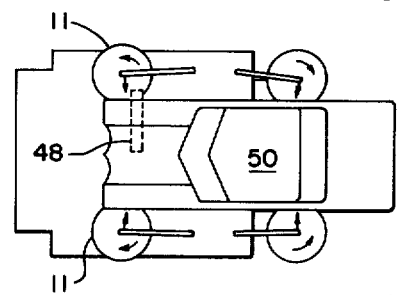

In FIG. 8, the front right tire of vehicle 50 has actuated floor switch 48 and as a result the pivotal force exerted on front/side brushes 11 has again been reversed. Front/side brushes 11 are now forcibly biased against the sides of vehicle 50.

As will be seen in FIGS. 6 through 8, the front/side brushes 11 remain in substantially continuous contact as they proceed around the front corners of the vehicle 50. This is due to the fact that brushes of this type are typically made up of a large number of long fibers mounted on a vertically disposed drum. The approximate relative size of this central drum is shown at 52 in FIG. 19. The purpose of actuating pneumatic detectors 44 (FIG. 6) and pivoting front/side brushes 11 out of the immediate path of the oncoming vehicle 50 (FIG. 7) is to avoid inadvertent collision with, or the hanging up of, central drum 52 (FIG. 19). As was pointed out earlier in the specification, it is possible on some vehicle configurations for the drum 52 (FIG. 19) to become entrapped or hung up in recessed portions of the leading edge of vehicle 50. These difficulties are substantially eliminated through the cooperation of front/side brushes 11 with pneumatic detectors 44 and front/side brushes 48. It should be noted that this safety feature is obtained without substantial loss of brush contact at the front corners of the vehicle 50.

Referring to FIG. 7, it is noted that the front/side brushes 11, as depicted in that figure, have completed their second pass across the leading edge of the vehicle 50.

Figure 9:
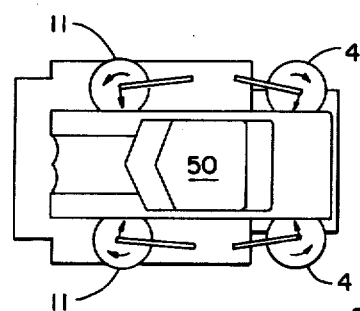

In FIG. 9, the vehicle 50 is nearing completion of the first side scrubbing operation while the front/side brushes 11 have completed approximately one-fourth of the second side scrubbing operation.

A comparison of FIGS. 4 and 9 reveals an additional important feature of the invention. In FIG. 4 it will be noted that the side/rear brushes 4 are positioned so as to be cleaning the internal surfaces of the front wheel wells. On the other hand, in FIG. 9, front/side brushes 11 are positioned so as to be cleaning the internal surfaces of the front wheel wells for a second time. However, in FIG. 9, the front/side brushes 11 are rotating in a direction opposite to the corresponding side/rear brushes 4 of FIG. 4 and accordingly give a preferential scrubbing to the forwardly disposed rear surfaces of the front wheel wells of vehicle 50. Thus, in addition to providing double coverage of the side surfaces, car washes embodying the present invention have the inherent capability for improved cleaning within surface irregularities.

Figure 10:
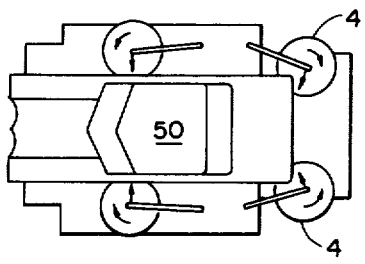

In FIG. 10, vehicle 50 has proceeded to a point where the side/rear brushes 4 have reached the rear or trailing corners and have thus substantially completed the first washing operation of the vehicle sides.

Figure 11:
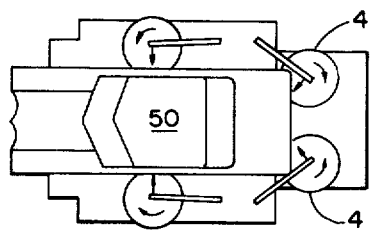

In FIG. 11, the vehicle 50 has proceeded to a point where the side/rear brushes 4 are beginning to proceed across the rear trailing side of the vehicle for the first time.

Figure 12:
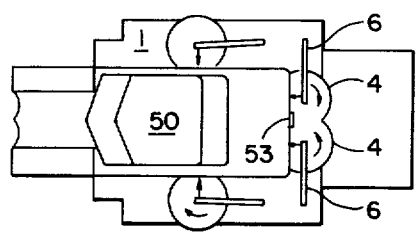

In FIG. 12, the vehicle 50 has reached a point where the upper support arms 6 associated with side/rear brushes 4 are perpendicularly disposed with respect to the center line of the brushing installation 1. FIG. 12 also illustrates that rear license plate 53 will be pressed against the rear surface of the vehicle 50 by the rotation of side/rear brushes 4 rather than being lifted and bent away from the trailing edge of the vehicle 50 as would be true with prior art devices having opposite brush rotation. At this point, the side/rear brushes 4 have completed their first pass over the rear or trailing side of the vehicle 50.

Figure 13:
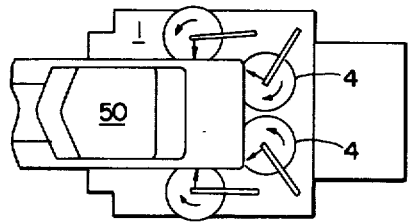

In FIG. 13, the vehicle 50 has proceeded still further through the washing installation 1 and the side/rear brushes 4 have commenced their second coverage of the rear surface of the vehicle 50.

Figure 14:
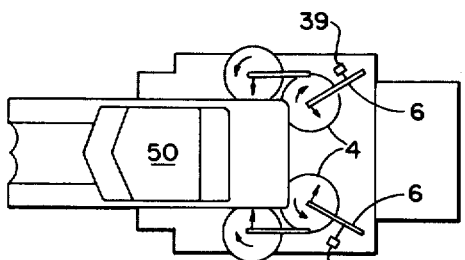

In FIG. 14, as the side/rear brushes 4 reach the trailing corners of vehicle 50, the second coverage of the trailing surface is completed and the horizontal support arms 6 actuate pneumatic detectors 39, thereby reversing the pivotal force exerted on the horizontal support arms 6 by drive cylinders 18. This change in pivotal direction returns side/rear brushes 4 to their initial position as is sequentially illustrated in FIGS. 14 through 17.

Figure 15:
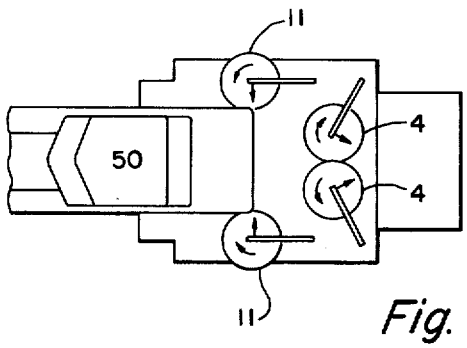

In FIG. 15, as the side/rear brushes 4 return to their initial position, the front/side brushes 11 complete the second side scrubbing operation.

Figure 16:
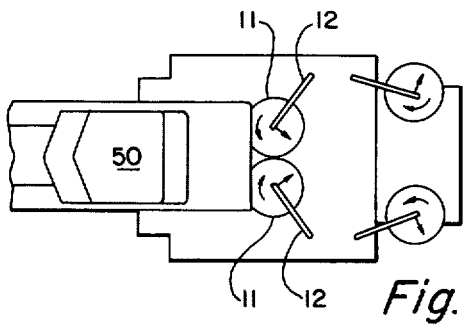

In FIG. 16, the front/side brushes 11 have cleared the rear corners of the vehicle 50 and the existing pivotal force exerted on horizontal support arms 12 assists these brushes in returning to their initial position as indicated in FIG. 17. It is noted with respect to FIG. 16 that, due to the deformability of the front/side brushes 11, they serve, to a limited extent, to provide a third coverage of the trailing surface of vehicle 50 as they pass toward their initial position.

Finally, in FIG. 17, it is seen that front/side brushes 11 have been returned to their position with horizontal support arms 12 being held in position against pneumatic bumbers 40. Side/rear brushes 4 are also in their initial position with their corresponding horizontal support arms 6 being held in position against pneumatic bumpers 38. Vehicle 50 has proceeded substantially out of the brushing installation 1 and the next vehicle 60 is in the same position as vehicle 50 was in FIG. 1.

By way of summary, it should be noted that the principal advantages of the method and apparatus described and claimed herein are: (a) the ability to scrub the front, side and rear surfaces of the vehicle twice while passing the vehicle through the installation only once; (b) the ability to give preferential scrubbing treatment to surface irregularities such as wheel wells; (c) the ability to scrub front and rear surfaces without deforming protrusions from these surfaces such as license plates; and, (d) the ability to avoid brush hangup adjacent the front corners of the vehicle while maintaining brush contact in this area.

It has been found that brushing installations embodying the present invention are considerably safer than prior art installations and are not as subject to damage in the event of malfunction. By way of example, should the driver accelerate the vehicle during the scrubbing operation, the brushes are either forced out of the vehicle path or are already at the sides of the vehicle and thus out of its path. If for some reason the biasing force on brushes 4 is removed prior to entry of the vehicle into the brushing installation 1 (see FIG. 1), the leading surface of the vehicle 50 will engage these malfunctioning side/rear brushes 4 and pivot them into front/side brushes 11. As side/rear brushes 4 are pivoted into their extreme rearward position, they correspondingly force front/side brushes 11 into their extreme rearward position, thereby allowing the vehicle 50 to pass through the washing installation 1 without damage either to the vehicle or to the scrubbing installation itself. In this regard it has been found that vehicles may be repeatedly driven through car washes embodying the present invention without the need for a surface conveyor capable of carefully controlling and synchronizing the speed and position of the vehicle relative to the car washing installation.

As is seen in FIG. 19, the side/rear brushes 4 and front/side brushes 11 are suspended from single, comparatively short horizontal support arms 6 and 12, respectively. In the prior art, in order to increase brush dwell time, it has been necessary to progressively increase this arm length and, in some cases, to add intermediate pivot joints to assure sufficient mechanical freedom. Long horizontal support arms and those having intermediate pivots are mechanically less attractive since they are more expensive, less sturdy and subject to pronounced mechanical wear at bearing points. It will be apparent to those skilled in the art that the disclosed method and apparatus for scrubbing the ends and sides of a motor vehicle may be modified in numerous ways and may assume various embodiments other than that preferred embodiment specifically set out and described above. By way of example, the vehicle may be maintained in a stationary position while the superstructure supporting the various brushes is passed over or moved relative to the vehicle. Furthermore, it will be obvious to those skilled in the art that the relative position of the front/side brushes 11 and the side/rear brushes 4 may be reversed. A large number of variations may be made in the switching, control and detection systems disclosed herein. Accordingly, it is intended by the appended claims to cover all such modifications of the invention which fall within the true spirit and scope of the invention.

I claim:

1. A method for scrubbing the front, rear and side surfaces of a vehicle as it moves relative to a washing installation, said installation having first and second pairs of independently pivoted side mounted brushes, said method including the sequentially initiated steps of:
   a. engaging each side surface of said vehicle with one brush in said first pair of brushes;
   b. transposing each brush in said first pair of brushes along the corresponding side surface of said vehicle from the front surface of said vehicle to the rear surface of said vehicle;
   c. engaging the front surface of said vehicle with said second pair of brushes;
   d. transposing each brush in said second pair of brushes across the front surface of said vehicle:
      i. from one side of the vehicle to at least the center of said vehicle and thereafter
      ii. from the center of said vehicle back to the side of said vehicle;
   e. engaging each side surface of said vehicle with one brush in said second pair of brushes;
   f. transposing each brush in said second pair of brushes along the corresponding side surface of said vehicle from the front surface of said vehicle to the rear surface of said vehicle;
   g. engaging the rear surface of said vehicle with said first pair of brushes;
   h. transposing each brush in said first pair of brushes across the rear surface of said vehicle:
      i. from one side of the vehicle to at least the center of said vehicle and thereafter;
      ii. from the center of said vehicle back to the side of the said vehicle.

2. The method of claim 1 wherein the method steps are sequentially executed and overlapping.

3. The method of claim 1 wherein the steps executed by said first pair of brushes are interchanged with the steps executed by said second pairs of brushes.

4. The method of claim 1 including the continuous step of rotating: (a) the brushes in said first pair of brushes in a direction pointing into the center of the rear surface of said vehicle and (b) the brushes in said second pair of brushes in a direction pointing into the center of the front surface of said vehicle.

5. The method of claim 1 wherein step (d) is followed by the intermediate step of biasing each brush in said second pair of brushes out of the vehicle path as said brushes are transposed across the front surface of said vehicle toward the sides of said vehicle.

6. Apparatus for scrubbing the front, rear and side surfaces of a vehicle as the vehicle moves through a path relative to a washing installation, said apparatus comprising in combination:
   a. a first pair of brushes for scrubbing the opposite side surfaces and the rear surface of said vehicle;
   b. a first pair of unitary support arms for separately mounting each brush in said first pair of brushes for independent pivotal translation through the path of said vehicle;
c. a second pair of brushes for scrubbing the front surface and the opposite side surfaces of said vehicle;
d. a second pair of unitary support arms for separately mounting each brush in said second pair of brushes for independent translation through the path of said vehicle;
e. means for engaging each side surface of said vehicle with one brush in said first pair of brushes;
f. means for transposing each brush in said first pair of brushes along the corresponding side surface of said vehicle from the front surface of said vehicle to the rear surface of said vehicle;
g. means for engaging the front surface of said vehicle with said second pair of brushes;
h. means for transposing each brush in said second pair of brushes across the front surface of said vehicle: (i) from one side of the vehicle to at least the center of said vehicle and thereafter, (ii) from the center of said vehicle back to the side of said vehicle;
i. means for engaging each side surface of said vehicle with one brush in said second pair of brushes;
j. means for transposing each brush in said second pair of brushes along the corresponding side surface of said vehicle from the front surface of said vehicle to the rear surface of said vehicle;
k. means for engaging the rear surface of said vehicle with said first pair of brushes;
l. means for transposing each brush in said first pair of brushes across the rear surface of said vehicle:
  i. from one side of the vehicle to at least the center of said vehicle and thereafter;
  ii. from the center of said vehicle back to the side of said vehicle;
whereby the front, rear and side surfaces of said vehicle are at least twice subjected to brushing while said vehicle only once passes said washing installation.

7. The apparatus of claim 6 including means for rotating: (a) the brushes in said first pair of brushes in a direction pointing into the center of the rear surface of said vehicle and (b) the brushes in said second pair of brushes in a direction pointing into the center of the front surface of said vehicle.

8. The apparatus of claim 6 including means for biasing each brush in said second pair of brushes out of the vehicle path as said brushes are transposed across the front surface of said vehicle toward the sides of said vehicle.

* * * * *